US012717628B2

(12) United States Patent
Pottlapelli et al.

(10) Patent No.: US 12,717,628 B2
(45) Date of Patent: Aug. 25, 2026

(54) SYSTEM AND METHOD FOR SHARING VITALS AMONG SERVICE REPLICAS TO ENABLE PROCESSING OF LONG RUNNING AUTOMATION WORKFLOWS IN A CONTAINER ORCHESTRATION SYSTEM

(71) Applicant: ORACLE INTERNATIONAL CORPORATION, Redwood Shores, CA (US)

(72) Inventors: Murali Pottlapelli, Chino, CA (US); Michal Chmielewski, Marina, CA (US); Yogesh Kumar, Saratoga, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 1005 days.

(21) Appl. No.: 17/894,760

(22) Filed: Aug. 24, 2022

(65) Prior Publication Data

US 2024/0069970 A1 Feb. 29, 2024

(51) Int. Cl.
*G06F 9/50* (2006.01)

(52) U.S. Cl.
CPC .................................. *G06F 9/5027* (2013.01)

(58) Field of Classification Search
CPC ..................................................... G06F 9/5027
See application file for complete search history.

(56) References Cited

U.S. PATENT DOCUMENTS 9,552,239 B2 1/2017 Kumar
10,296,297 B2 5/2019 Kumar
10,489,203 B2 11/2019 Kumar
2012/0272247 A1* 10/2012 Scott ..................... G06F 9/4881 718/107
2013/0138886 A1* 5/2013 Yamauchi ........... G06F 12/0888 711/120
2015/0046902 A1 2/2015 Kumar
2015/0046929 A1 2/2015 Kumar
2016/0292008 A1 10/2016 Kumar
2021/0084103 A1* 3/2021 Smith ................... G06F 16/285
2021/0328858 A1* 10/2021 Asveren .............. H04L 61/5007
2022/0197684 A1* 6/2022 Desai .................. G06F 9/45558
2022/0206902 A1* 6/2022 Hoang .................... G06F 9/485
2023/0035375 A1* 2/2023 Tang ..................... H04L 43/028

* cited by examiner

*Primary Examiner* — Michael W Ayers
(74) *Attorney, Agent, or Firm* — TUCKER ELLIS LLP

(57) ABSTRACT

Described herein are systems and methods for sharing vitals among service replicas to enable processing of long running workflows within a container orchestration system. A method can provide a container orchestration system that provides within one or more container orchestration environments, a runtime for containerized workloads and services. The method can provide a healthbus within the container orchestration system, the healthbus comprising a memory. The method can deploy a plurality of pods within the container orchestration system, each pod comprising a memory. The method can periodically publish, by each pod, a health message to the healthbus, the health message comprising at least an indication of an identification of the pod and an indication of a time interval in which the pod has been active. The method can periodically query, by each pod, the healthbus to determine a world view of the container orchestration system.

20 Claims, 10 Drawing Sheets

SYSTEM AND METHOD FOR SHARING VITALS AMONG SERVICE REPLICAS TO ENABLE PROCESSING OF LONG RUNNING AUTOMATION WORKFLOWS IN A CONTAINER ORCHESTRATION SYSTEM

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

Embodiments described herein are generally related to cloud computing, and containerized software environments, and are particularly directed to a system and method for sharing vitals among service replicas to enable processing of long running automation workflows in a container orchestration system.

BACKGROUND

Within a cloud computing environment, a container orchestration system can be used to provide a runtime environment for containerized workloads and services that are deployed to the system as software stacks. Such an environment can support different types of software stacks that can be provided as services for use by the customers or tenants of the environment.

However, one of the drawbacks of such environments is support for long running workflows. As service replicas can and do go offline for various reasons, long running workflows that may not always be actively worked on by an assigned service replica can get lost or go abandoned or may fail to process.

SUMMARY

In accordance with an embodiment, described herein are systems and methods for sharing vitals among service replicas to enable processing of long running workflows within a container orchestration system. A method can provide a container orchestration system that provides within one or more container orchestration environments, a runtime for containerized workloads and services. The method can provide a healthbus within the container orchestration system, the healthbus comprising a memory. The method can deploy a plurality of pods within the container orchestration system, each pod comprising a memory. The method can periodically publish, by each pod, a health message to the healthbus, the health message comprising at least an indication of an identification of the pod and an indication of a time interval in which the pod has been active. The method can periodically query, by each pod, the healthbus to determine a world view of the container orchestration system.

DETAILED DESCRIPTION

Figure 1:
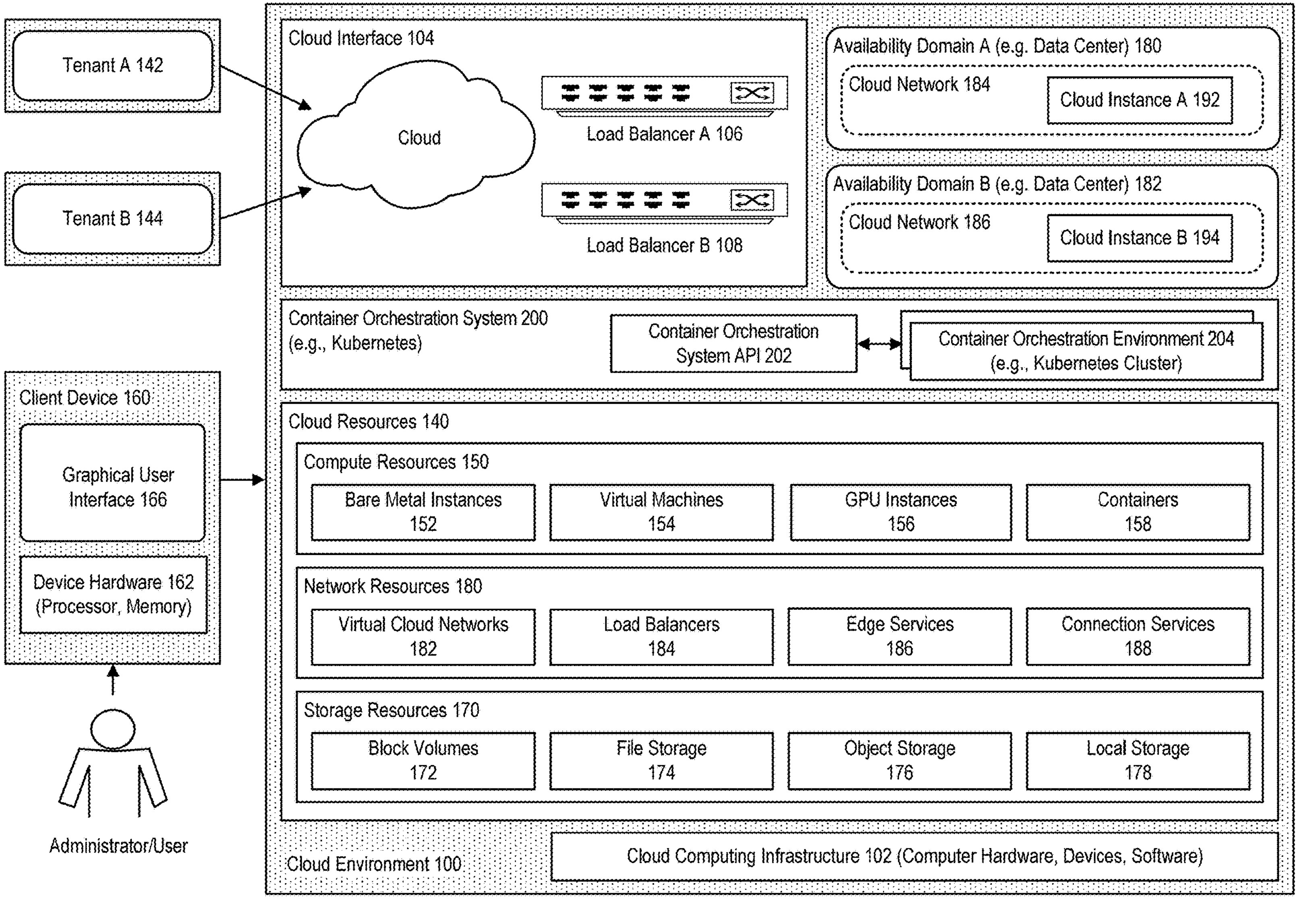
FIG. 1 illustrates an example cloud environment that includes a container orchestration system, in accordance with an embodiment.

Within a cloud computing environment, a container orchestration system can be used to provide a runtime environment for containerized workloads and services that are deployed to the system as software stacks. Such an environment can support different types of software stacks that can be provided as services for use by the customers or tenants of the environment.

In accordance with an embodiment, described herein are systems and methods for sharing vitals among service replicas to enable processing of long running workflows within a container orchestration system.

In accordance with an embodiment, various details of a particular implementation or embodiment are provided below. The description is provided for the purposes of illustration and description. It is not intended to be exhaustive or to limit the scope of protection to the precise forms disclosed. Many modifications and variations will be apparent to the practitioner skilled in the art.

In accordance with an embodiment, various components, processes, and features are described herein, including:

Container Orchestration System

In accordance with an embodiment, a container orchestration system provides a runtime for containerized workloads and services. Examples of container orchestration systems can include Kubernetes, and Docker Swarm.

Container Orchestration Environment

In accordance with an embodiment, a container orchestration environment (environment) is an instance of a container orchestration system. For example, a specific Kubernetes cluster, or a specific Docker Swarm instance, are examples of (respectively Kubernetes, or Docker Swarm) container orchestration environments.

Container Orchestration Implementation

In accordance with an embodiment, a container orchestration implementation (referred to herein in some embodiments as a container orchestration vendor, or vendor) is an implementation provider for a particular type of container orchestration system.

Examples of container orchestration implementations include Oracle Container Engine for Kubernetes (OKE), and Amazon Elastic Kubernetes Service (EKS), both of which provide container orchestration implementations (i.e., are vendors) for Kubernetes.

Node

In accordance with an embodiment, a node can be an individual bare metal machine or virtual machine (VM), to which containers are scheduled to run within a container orchestration environment, for example as part of a Kubernetes cluster or Docker Swarm instance. In some embodiments herein, a node can be referred to as a pod. Likewise, nodes can be referred to as pods.

Node Labels

In accordance with an embodiment, node labels can be represented as key-value pairs that are associated with each node in the container orchestration environment. Supported container orchestration systems provide the ability to associate node labels with nodes, wherein such labels can indicate, for example: (a) one or more fault domain(s) in which the node is running; and (b) a date or time at which the node was created.

Fault Domain

In accordance with an embodiment, a fault domain is a group of nodes that share some physical infrastructure. For example, a particular node can be associated with one more fault domains, examples of which may include regions (e.g., a geographical area, such as a city), availability zones (partitioning within a region with dedicated power and cooling), or other fine-grained partitioning of a physical infrastructure (e.g., a semi-isolated rack within a data center).

Application Workload

In accordance with an embodiment, an application workload is a custom application that has been deployed within a container orchestration environment.

Software Stack

In accordance with an embodiment, a software stack is a collection of software components deployed together as a collection of containers.

Software Stack Instance

In accordance with an embodiment, a software stack instance is a specific instantiation of a software stack that has been deployed for a specific customer or tenant. Each software stack instance is single-tenant—containers or data from a particular software stack instance are not shared with another software stack instance.

Fleet

In accordance with an embodiment, a fleet is collection of software stack instances running on a particular container orchestration system. A container orchestration system can be managed by a central product team (the owning team), as a multi-tenant environment that runs software stack instances for a plurality of customer or tenants.

Owning Team

In accordance with an embodiment, an owning team is an administrative entity or product team responsible for maintaining and running the container orchestration system and the software that runs on it.

Metadata

In accordance with an embodiment, as referred to herein metadata is a lightweight configuration data that is stored in the container orchestration environment itself. Metadata can be retrieved and watched by a controller acting on the container orchestration environment. Supported container orchestration systems provide the ability to read and write the metadata associated with their container orchestration environments.

Instance Metadata

In accordance with an embodiment, an instance metadata describes an expected configuration state of a particular instance, in a format that is understood by the controller. All instance metadata resides within the container orchestration system itself.

Instance Metadata—Versioning

In accordance with an embodiment, the instance metadata format can be augmented to include fields associated with specifying a configuration or version to be used with a software stack instance, for example:

- desiredVersion—the controller version intended to be used for this instance
- currentVersion—the controller version that is currently being used for this instance Instance Metadata—Ring In accordance with an embodiment, the instance metadata format can be augmented to include fields associated with specifying a relative importance of a particular instance with respect to other instances in a fleet, referred to herein in some examples as a ring value. When used as part of a software deployment process, the higher the ring value, the later the instance will be updated in the deployment flow. All instances in a given ring will be guaranteed to be fully and successfully processed before proceeding to the next ring. The range of ring values can be from 0 to some arbitrary maximum.

Controller

In accordance with an embodiment, a controller is a software component or a process of the container orchestration system that watches a container orchestration environment for events and state changes, and then performs some action as a result. The controller uses one or more application program interfaces (API) provided by the container orchestration system for both the event watching and to take any action within the container orchestration environment. For example, the controller watches the container orchestration system for available instance metadata, and realizes the expected state of the implied instance, including containers and other container orchestration system primitives.

Instance-Scoped Controller

In accordance with an embodiment, an instance-scoped controller is a controller run per instance. Each instance-scoped controller is limited in scope: only watching and acting upon one particular instance. An instance-scoped controller is also responsible for performing health/readiness checks against the instance, and verifying that the instance has been successfully updated in accordance with whichever criteria that means for the software stack in question). Once its instance's components are fully running and healthy, the instance-scoped controller updates the instance's metadata currentVersion to the value of its desiredVersion.

Super Controller

In accordance with an embodiment, a super controller is a controller that is responsible for launching the instance-scoped controllers for the various software stack instances. The super controller watches instance metadata for all instances in current use, and ensures an instance-scoped controller is launched for each, based on its desiredVersion field. One super controller is run for the entirety of the container orchestration system.

Controller Version

In accordance with an embodiment, a controller version refers to a specific version of the code of the controller, wherein a new version of a controller may bring about a new expected state of instances.

Controller Pattern

In accordance with an embodiment, a controller pattern is the design pattern of using a controller to realize the expected state of instances based on instance metadata.

Deployment Process

In accordance with an embodiment, a deployment process is the process by which the owning team updates the controller.

Containerized (Cloud) Environments

FIG. 1 illustrates an example cloud environment that includes a container orchestration system, in accordance with an embodiment.

In accordance with an embodiment, the components and processes illustrated in FIG. 1, and as further described herein with regard to various embodiments, can be provided as software or program code executable by a computer system or other type of processing device, for example a cloud computing system.

The illustrated example is provided for purposes of illustrating a computing environment within which a container orchestration system can be used to support application workloads. In accordance with other embodiments, the various components, processes, and features described herein can be used with other types of container orchestration systems, or other types of computing environments.

As illustrated in FIG. 1, in accordance with an embodiment, a cloud computing environment (cloud environment) 100 can operate on a cloud computing infrastructure 102 comprising hardware (e.g., processor, memory), software resources, and one or more cloud interfaces 104 or other application program interfaces (API) that provide access to the shared cloud resources via one or more load balancers A 106, B 108.

In accordance with an embodiment, the cloud environment supports the use of availability domains, such as for example availability domains A 180, and availability domains A B 182, which enables customers to create and access cloud networks 184, 186, and run cloud instances A 192, B 194.

In accordance with an embodiment, a tenancy can be created for each cloud customer or tenant, for example tenant A 142, B 144, which provides a secure and isolated partition within the cloud environment within which the customer can create, organize, and administer their cloud resources. A cloud customer or tenant can access an availability domain and a cloud network to access each of their cloud instances.

In accordance with an embodiment, a client device, such as, for example, a computing device 160 having a device hardware 162 (e.g., processor, memory), and graphical user interface 166, can enable an administrator or other user to communicate with the cloud computing environment via a network such as, for example, a wide area network, local area network, or the Internet, to create or update cloud services.

In accordance with an embodiment, the cloud environment provides access to shared cloud resources 140 via, for example, a compute resources layer 150, a network resources layer 180, and/or a storage resources layer 170. Customers can launch cloud instances as needed, to meet compute and application requirements. After a customer provisions and launches a cloud instance, the provisioned cloud instance can be accessed from, for example, a client device.

In accordance with an embodiment, the compute resources layer can comprise resources, such as, for example, bare metal cloud instances 152, virtual machines 154, graphical processing unit (GPU) compute cloud instances 156, and/or containers 158. The compute resources layer can be used to, for example, provision and manage bare metal compute cloud instances, or provision cloud instances as needed to deploy and run applications, as in an on-premises data center.

For example, in accordance with an embodiment, the cloud environment can be used to provide control of physical host ("bare metal") machines within the compute resources layer, which run as compute cloud instances directly on bare metal servers, without a hypervisor.

In accordance with an embodiment, the cloud environment can also provide control of virtual machines within the compute resources layer, which can be launched, for example, from an image, wherein the types and quantities of resources available to a virtual machine cloud instance can be determined, for example, based upon the image that the virtual machine was launched from.

In accordance with an embodiment, the network resources layer can comprise a number of network-related resources, such as, for example, virtual cloud networks (VCNs) 182, load balancers 184, edge services 186, and/or connection services 188.

In accordance with an embodiment, the storage resources layer can comprise a number of resources, such as, for example, data/block volumes 172, file storage 174, object storage 176, and/or local storage 178.

In accordance with an embodiment, the cloud environment can include a container orchestration system 200, and container orchestration system API 202, that enables containerized application workflows to be deployed to a container orchestration environment 204, for example a Kubernetes cluster.

For example, in accordance with an embodiment, the cloud environment can be used to provide containerized compute cloud instances within the compute resources layer, and a container orchestration implementation (e.g., OKE), can be used to build and launch containerized applications or cloud-native applications, specify compute resources that the containerized application requires, and provision the required compute resources.

Containerized Workflows

Figure 2:
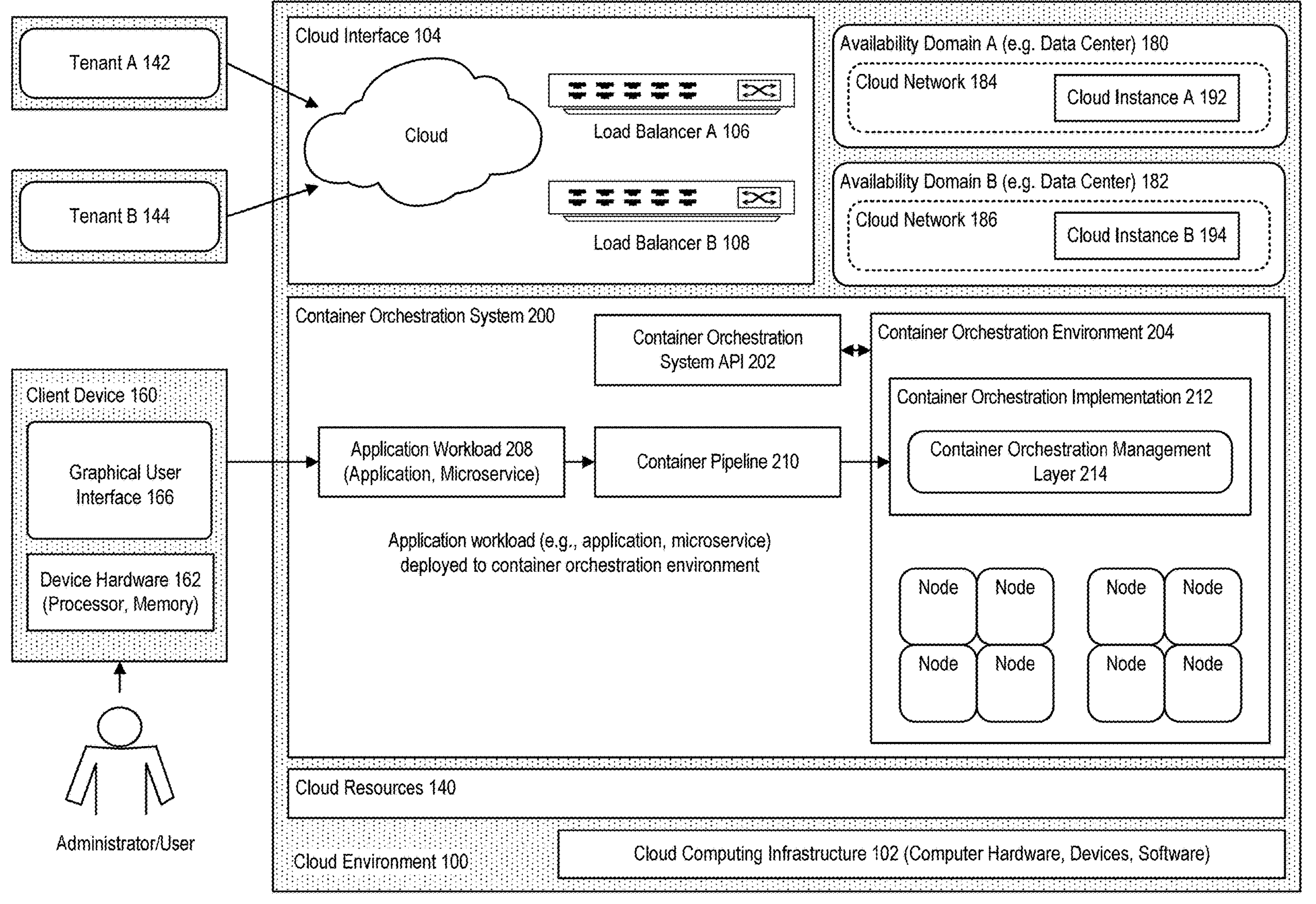
FIG. 2 further illustrates the use of a container orchestration system, in accordance with an embodiment.
Figure 3:
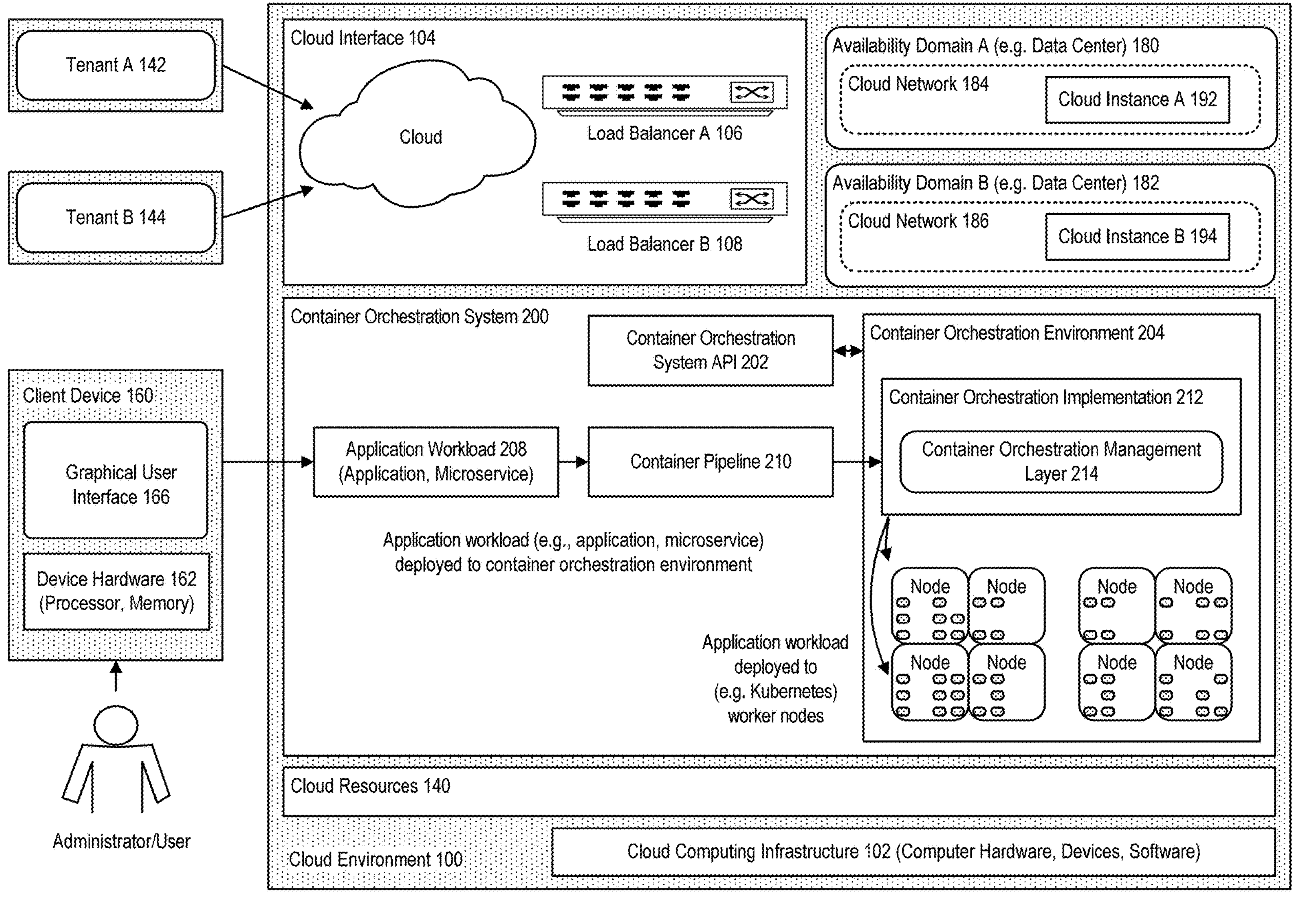
FIG. 3 further illustrates the use of a container orchestration system, in accordance with an embodiment.
Figure 4:
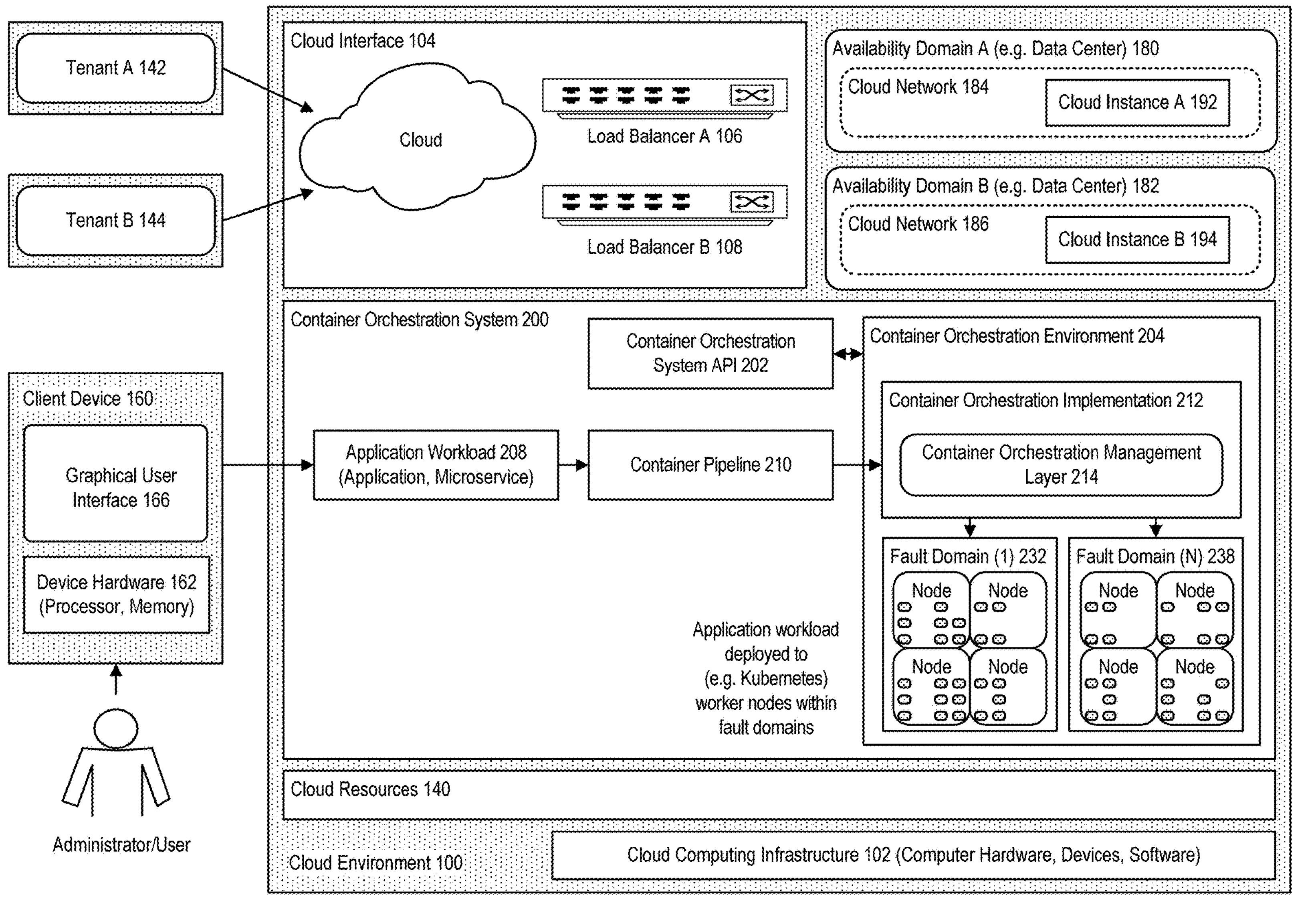
FIG. 4 further illustrates the use of a container orchestration system, in accordance with an embodiment.

FIGS. 2-4 further illustrate the use of a container orchestration system, in accordance with an embodiment.

As illustrated in FIG. 2, in accordance with an embodiment, the container orchestration system enables an application workload 208 (e.g., an application, or microservice) to be deployed to the environment, via a container pipeline 210. The container orchestration implementation (vendor) 212 provides a container orchestration management layer 214 adapted to schedule application workload containers to run on various nodes.

As illustrated in FIG. 3, in accordance with an embodiment, an application workload can be deployed to a plurality of (e.g., Kubernetes) worker nodes.

As illustrated in FIG. 4, in accordance with an embodiment, the container orchestration environment is adapted to assign and launch containerized workloads to select nodes, including in some environments to fault domains 232, 238 (i.e., groups of nodes that share some physical infrastructure).

Sharing Vitals Among Service Replicas to Support Long Running Workflows

As described above, while container orchestration environments are scalable and can provide much desired flexibility, one of the drawbacks of such environments comes from long running workflows. To distinguish such long running workflows, it is useful to distinguish between short running workflows and long running workflows.

In accordance with an embodiment, each service that can be requested can be associated with a blueprint. Every time the service is requested (e.g., by the same tenant or different tenants), the systems can execute the blueprint, which creates an instance of the execution in one or more nodes/pods. During that instance of the execution, the systems can have services that run these workflows that can appear and disappear. Under heavy load, you can have 10s or 100s of these instances being handled at the same time.

In accordance with an embodiment, when a request is received to start a service, or a service instance, a blueprint can be utilized to start a replica, or a plurality of replicas, of the service based upon the blueprint running on one or more nodes/pods. For synchronous processes, such as a "get data" blueprint, the health or status of a node/pod is less important as the time for the process or transaction is generally short (e.g., in the range of 300 seconds or less). Such synchronous processes can start and will generally finish without disruption to the node/pod running the service instance. That is, a node/pod will generally not "put down" or stop running the requested service prior to the service completing.

In accordance with an embodiment, however, issues may arise for "long running" transactions, or transaction that generally run longer than 300 seconds, as the nodes/pods are considered "mortal" in that the nodes/pods may go offline or shut down. This can be due to the length of time that the requested service is required to run, or it can be because a node/pod has "put down" or stopped working on a particular service while it waits for a response from a different system entirely (e.g., asynchronous transactions where one or more responses are required from the same or different systems in order for a service to complete). During such times, a node/pod may pick up another blueprint/service and run that while waiting for the requested response.

In accordance with an embodiment, nodes/pods can be considered "mortal"—they are occasionally shut down or evicted. Because the pods are mortal, and a pod contains a replica of the engine, when the system processes the workflow graphs, it is desirable to ensure that the workflow doesn't run twice—this means that it needs to be ensured that one replica picks the service up in order to avoid duplicate processing.

In accordance with an embodiment, the replica contains the engine, the engine runs the graphs, the graphs produce instances. Short running services/workflows are synchronous. When a request for a service is received, the request is processed, which ends with a result. There is no opportunity for duplication of execution during short running, synchronous processes. However, long running services present difficulties. Upon received a request for such a service, a signal starts the run of the service (e.g., deploying the service to a pod/node based upon a blueprint), and a reply is returned signaling that the long running process has been started. The graph then, however, may send a call to a different process, and the graph may be shut down while it waits for a reply. Once the reply comes back, the system needs to ensure that only one replica continues the long-running process.

In accordance with an embodiment, several issues are presented by these problems presented by long running services. First, the systems and methods desire a replica set that scales, which scaling can based on CPU, memory. The systems and methods desire the ability to limit concurrency per service instance/tenancy or scale to meet SLAs. As well, the ability to process a new request, manage request queue, and continue processing pending requests optimally while honoring the constraints meeting SLAs. Finally, the ability to identify the node/pod termination, move stalled instances (e.g., due to terminated replica) to available nodes/pods.

Currently, Kubernetes and other container orchestration solutions provide some ability to scale based upon, e.g., CPU and memory, but such scaling is provided only for synchronous services. However, because such scaling is based upon knowledge about the state of any given replica, such information is not generally available for long running workflows. What is needed, however, is a way to provide scaling for long running workflows.

In accordance with an embodiment, the systems and methods described herein provide for a healthbus (e.g., in the form of a Kafka topic) where nodes/pods can publish, for example, periodically, health information about the node/pod. A memory of the healthbus can be queried by any other pod/node to obtain the status of every other operational pod/node within the system.

In accordance with an embodiment, when a service is activated in the pod/node, the replica can begin broadcasting a health message to, for example, the healthbus. Based upon the information contained within the healthbus, each other pod/node can build a world view of the system. Each replica can continue to broadcast its own health information. The pods build out the view of the world, which can lead to, for example, a determination that a pod that has not broadcasted recently has probably died.

In accordance with an embodiment, each pod/node has an internal memory table that can be populated by the pod/node to build a world view based on what the pod queries within the healthbus.

In accordance with an embodiment, each replica can store its state in an instance store. Currently, for example, if a pod/node is lost, the other pods are not aware of it. However, because the instance store is where each pod/node stores the state of the instance of execution of one graph, upon a node dying, another node can be able to pick up the execution of the replica and continue to process it from the point where the first pod/node died.

Figure 5:
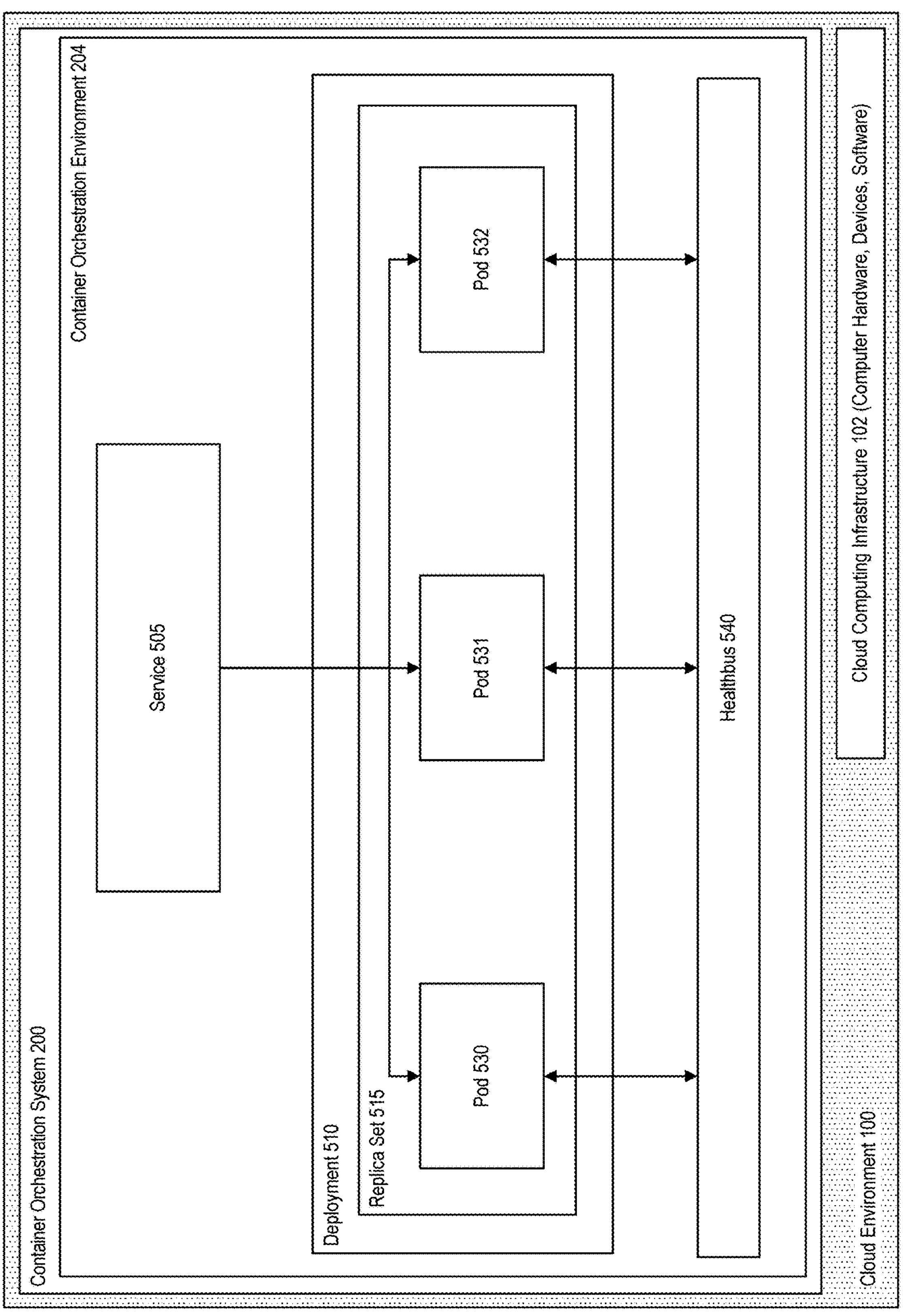
FIG. 5 illustrates a healthbus within a container orchestration system, in accordance with an embodiment.

FIG. 5 illustrates a healthbus within a container orchestration system, in accordance with an embodiment.

As illustrated in FIG. 5, in accordance with an embodiment, a service 505 is requested. While shown within the container orchestration system 200, the service 505 can be requested from an input external to the container orchestration system. Upon the service 505 being requested, a deployment 510 is established which manages a replica set 515. Within the replica set, a number of pods/nodes 530, 531, 532, are spun up or collected (e.g., depending on whether a sufficient number of pods are already available to the service instance (i.e., tenancy) associated with the requested serviced 505), and each node has deployed therein a blueprint of the requested service.

In accordance with an embodiment, the replica set 515 can be defined with fields, that define, for example, a way to identify pods the replica set can acquire, a number of replicas indicating how many pods the replica set should be maintaining, and a pod template specifying the data of new pods that can be started in order to meet, for example, service level agreements. New pods can be created, for example, based upon a pod template.

In accordance with an embodiment, a deployment 510 can comprise another level of hierarchy which is responsible for managing and maintain the replica set 515. The replica set can deploy a copy of the replica to each pod within the replica set.

In accordance with an embodiment, each pod/node 530, 531, 532 can comprise its own internal memory (not shown) within which each pod/node can populate and maintain a world view of each other pod/node that is accessible, based upon its interaction with the healthbus.

In accordance with an embodiment, a healthbus 540 can be further provided within the container orchestration system 200. The healthbus can comprise, for example, a memory. In certain embodiments, the healthbus 540 can comprise a Kafka topic.

Each pod contains a replica of the blueprint associated with the requested service. When the pods are running, the systems ensure that work is not duplicated in that no two pods should be executing the same workflow. Every workflow has an instance of execution, and each instance of execution is executed by only one pod (e.g., only one pod at a time). There is a hierarchy of—a replica contains an engine, the engine contains graphs, and the graphs produce instances of execution.

Figure 6:
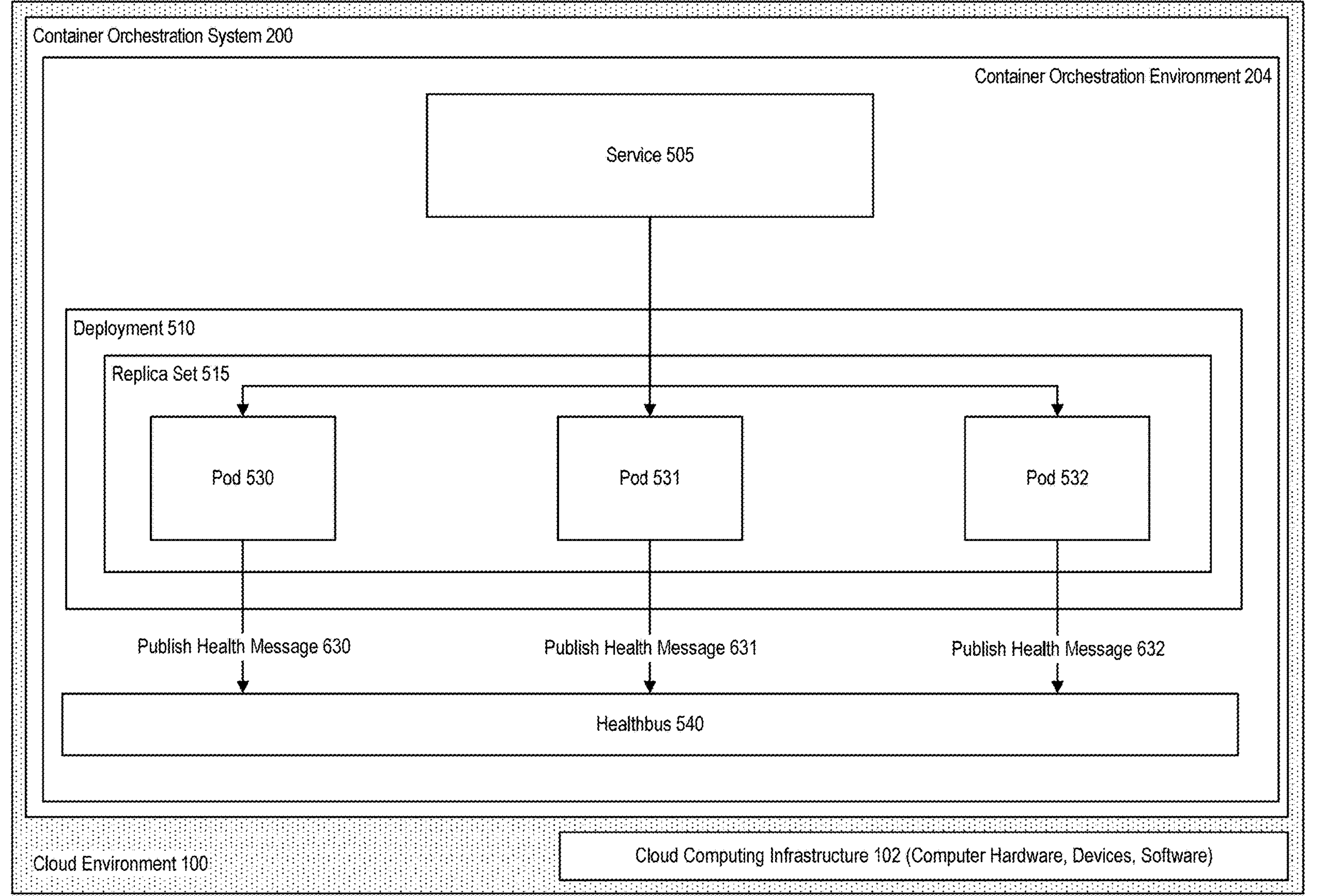
FIG. 6 illustrates pod communication with a healthbus within a container orchestration system, in accordance with an embodiment.

FIG. 6 illustrates pod communication with a healthbus within a container orchestration system, in accordance with an embodiment.

As illustrated in FIG. 6, in accordance with an embodiment, each pod/node 530, 531, 532 can periodically publish 630, 631, 632 a health message (which can also be referred to as a heartbeat message) to the healthbus 540. Such periodic publication of a health message can, for example, be based on a period set by a configuration file associated with each pod/node, set by user input, set by a configuration file associated with the requested service, or other similar mechanisms.

In accordance with an embodiment, each health message published to the health bus can comprise certain information about the pod/node which publishes the health message. Such information can comprise, for example, an identification of the pod, an indication of an interval of time the pod has been "alive" or active, and which integrations the pod is currently working on. In addition, the health message can also comprise an indication of which other pods the sending pod is aware of that are "alive" or active, and an indication of a time which the pod is aware of since the other pods have been active. An exemplary heath message, or heartbeat message, is provided below:

```
{
  "podId":"mcube-123",
  "aliveSince":"1644003614",
  "Integrations":[
    {
      "integrationName":"update-w4",
      "activeInstanceCount":"250",
      "SI":"business-hr"
    },
  {
    "integrationName":"annualReview",
    "activeInstanceCount":"300",
    "SI":" business -hr"
    }
],
"knownPodIds":[
  {
```

-continued

```
      "podId":"mcube-124",
      "aliveSince":"1644003502"
      },
      {
      "podId":"mcube-122",
      "aliveSince":"1644003402"
      }
    ]
    }
```

In accordance with an embodiment, the above health message comprises information about the sending pod, namely mcube-123, a time since the pod has been active, as well as the integrations the pod is currently working on, namely "update-w4" and "annualReview", and information associated with said integrations. In addition, the health message also comprises information related to additional pods that the sending pod is aware of. In the above example, this includes pod mcube-124 and pod mcube-122, as well as times since those pods have been active.

In accordance with an embodiment, by providing a mechanism for pods/nodes to build a world view of each other pod/node within the environment, this allows for pods/nodes to be more independent in determining whether to process a new request, forward it to another replica at a different pod/node, or put it in queue based on certain factors, such as a service level agreement for a given service instance (i.e., tenant). In addition, this world view allows for pods/nodes to continue the processing of queued requests, pick up requests from terminated replicas at pods/nodes that have gone offline, and also triggers scaling by publishing metrics.

In accordance with an embodiment, by providing the mechanism for each pod/node to maintain its own world view/consistency state, this eliminates single point of failure, e.g., upon a pod/node going offline and having its replicas running long running workflows go offline without a mechanism to recover such transactions.

In accordance with an embodiment, additionally, by providing the mechanism for each pod/node to maintain its own world view/consistency state, this allows for each replica to make a decision whether to, upon receiving a new request, queue the request, process it, or forward a message to a neighboring replica at a neighboring node that the originating node determines to be running at a lower volume based upon the world view maintained at the node. This can be supported as each node maintains a current world view, and can thus determine whether a neighboring node, sharing a replica, is less loaded than the node itself.

In accordance with an embodiment, as each node has gathered information from the healthbus and maintains its own world view, each pod is aware of what is happening in each other replica in each other pods. Each pod can, based on its own information, make decisions independently.

In accordance with an embodiment, the by providing the mechanism for each pod/node to maintain its own world view/consistency state, this allows the system to dynamically configure replicas to process certain subset of messages (e.g., by service instance, type of integration, etc.) with, at worst, a one-hop count for message delivery prior to execution.

In accordance with an embodiment, the by providing the mechanism for each pod/node to maintain its own world view/consistency state provides tools to solve the "N×M problem" where N replicas load all M integration for all service instances at peak execution points.

Figure 7:
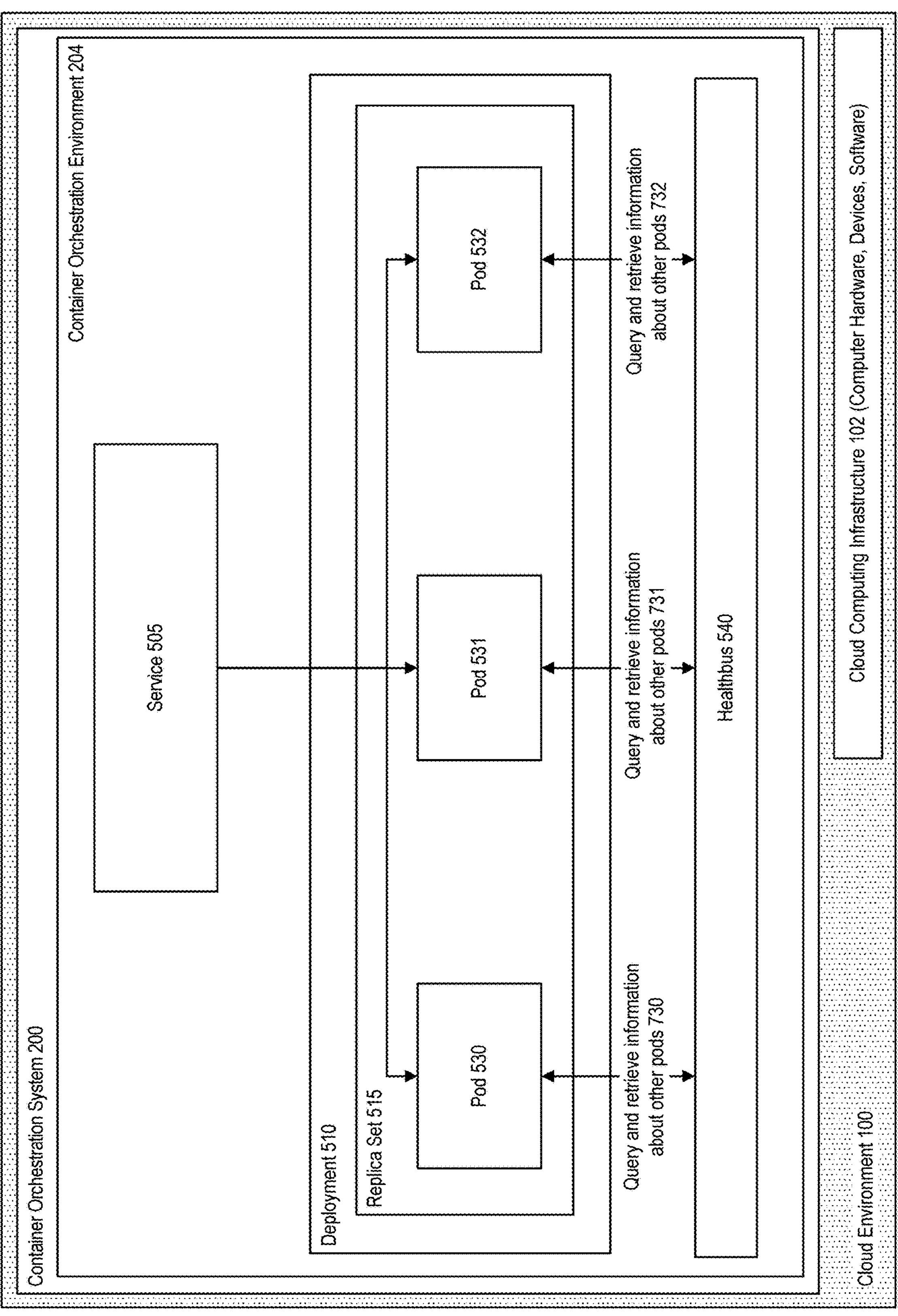
FIG. 7 illustrates pod communication with a healthbus within a container orchestration system, in accordance with an embodiment.

FIG. 7 illustrates pod communication with a healthbus within a container orchestration system, in accordance with an embodiment.

As illustrated in FIG. 7, in accordance with an embodiment, each pod/node 530, 531, 532 can periodically query and retrieve 730, 731, 732 the healthbus to gather information about each other visible pod/node. Such periodic querying of the healthbus can, for example, be based on a period set by a configuration file associated with each pod/node, set by user input, set by a configuration file associated with the requested service, or other similar mechanisms.

In accordance with an embodiment, by querying the healthbus and receiving the information contained in each other pod's health message, each pod can then build and maintain within a memory associated with each pod a world view of, for example, the deployment or the replica set. Such world view can, for example, comprise identifications of the pods, indications of an interval of time each pod has been "alive" or active, and which integrations each pod is currently working on.

Figure 8:
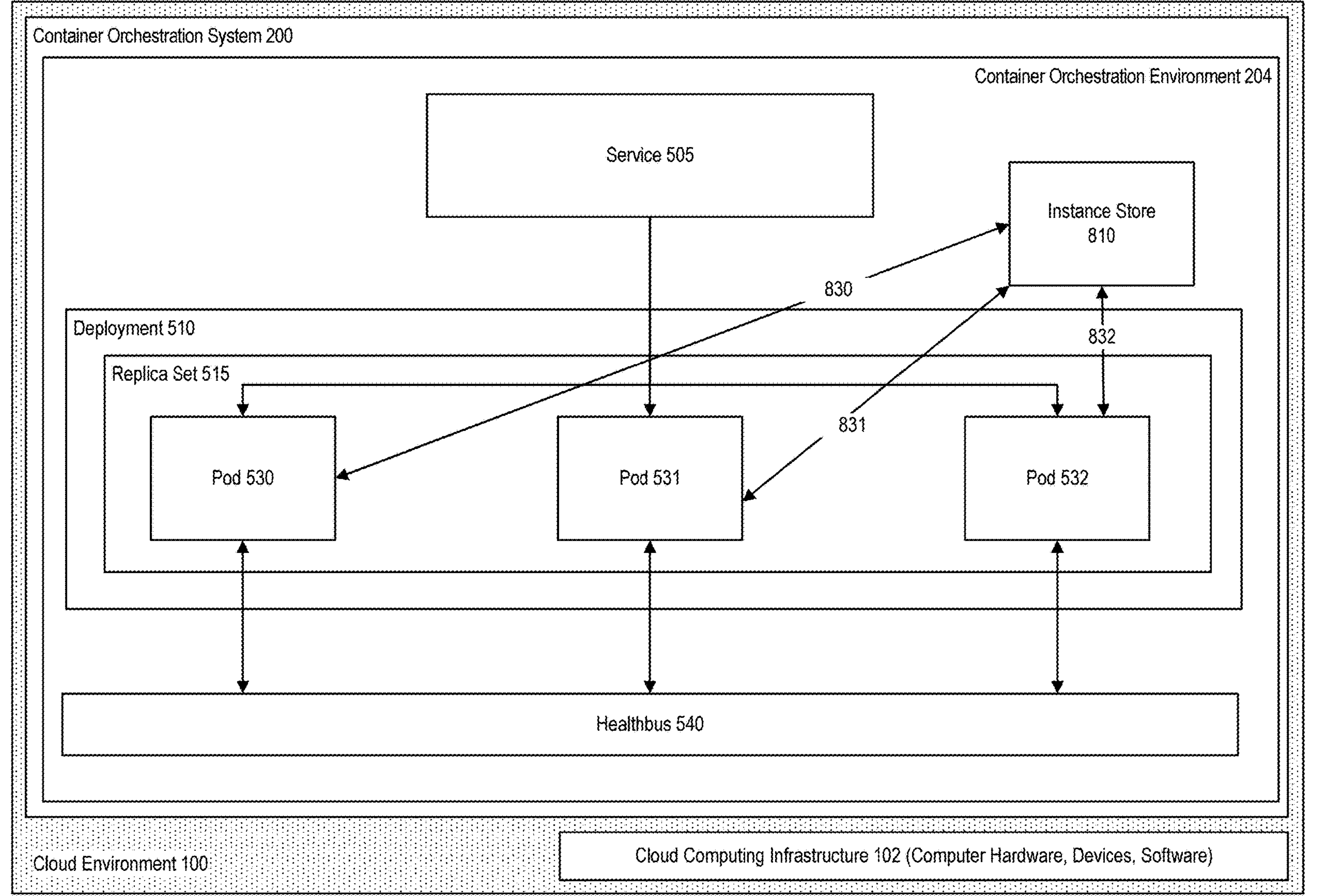
FIG. 8 illustrates pod communication with an instance store within a container orchestration system, in accordance with an embodiment.

FIG. 8 illustrates pod communication with an instance store within a container orchestration system, in accordance with an embodiment.

As illustrated in FIG. 8, in accordance with an embodiment, each pod/node 530, 531, 532 communicate 830, 831, 832 with an instance store 810 provided within the container orchestration system. Each pod and replica therein can store its state in the instance store. The instance store is where the pods store the state of the instance of execution of a graph the pod is running. For example, for a long running work flow where the pod/node does not go offline or die, a pod can store the state of execution of the graph within the instance store while waiting for a response from another system. Then, while waiting for a response, the pod can release all memory currently being used for the long running workflow and utilize that memory for running other graphs. The instance store, in this way, allows a pod to release all compute resources until a trigger to again process the long-running workflow.

Figure 9:
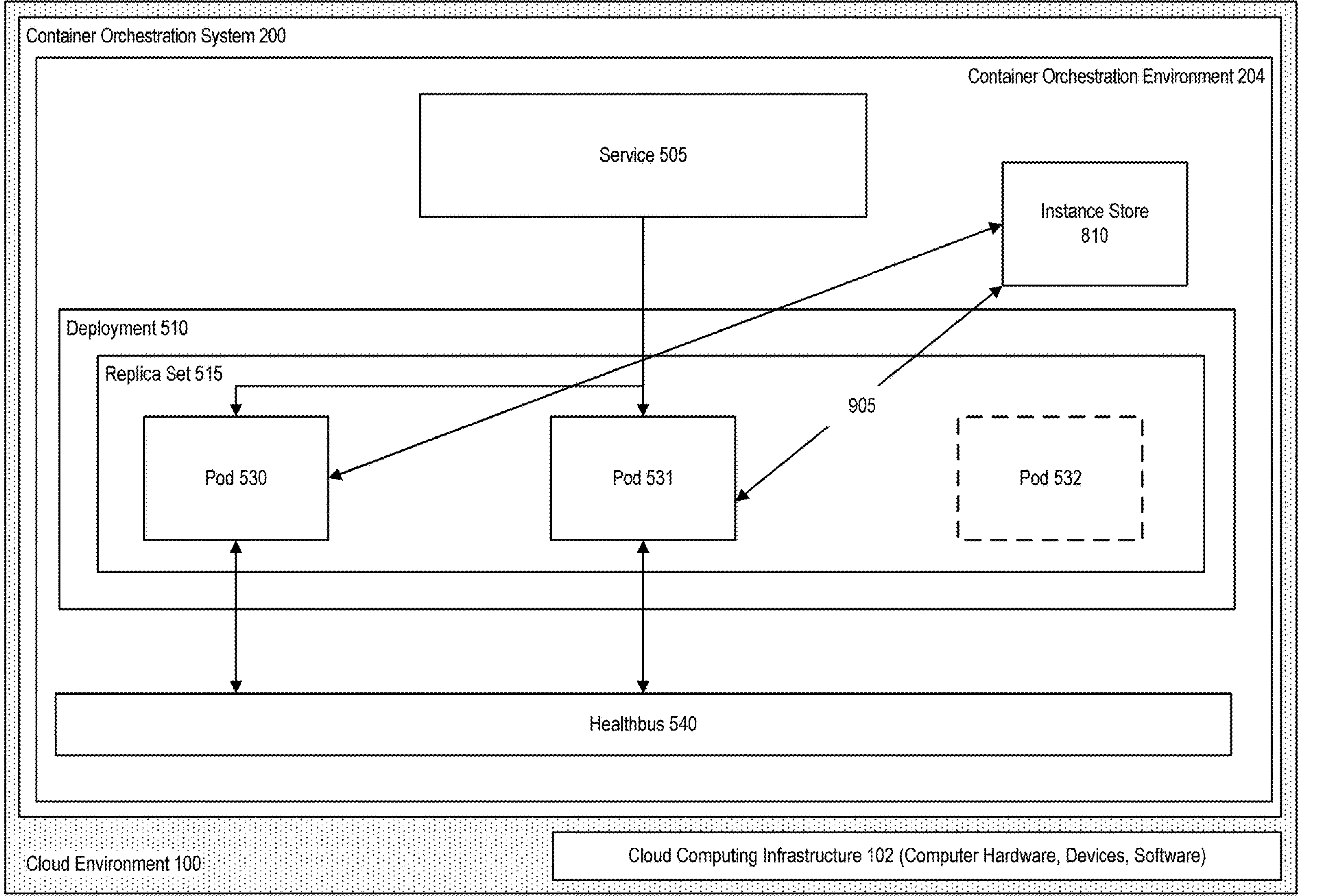
FIG. 9 illustrates pod communication with an instance store for workflow continuation on pod termination within a container orchestration system, in accordance with an embodiment.

FIG. 9 illustrates pod communication with an instance store for workflow continuation on pod termination within a container orchestration system, in accordance with an embodiment.

As illustrated in FIG. 9, in accordance with an embodiment, each pod/node 530, 531, 532 communicates with an instance store 810 provided within the container orchestration system. Each pod and replica therein can store its state in the instance store. The instance store is where the pods store the state of the instance of execution of a graph the pod is running. For example, for a long running work flow where the pod/node does not go offline or die, a pod can store the state of execution of the graph within the instance store while waiting for a response from another system. Then, while waiting for a response, the pod can release all memory currently being used for the long running workflow and utilize that memory for running other graphs. The instance store, in this way, allows a pod to release all compute resources until a trigger to again process the long-running workflow.

In accordance with an embodiment, the present embodiment depicts an example of when a pod dies or goes offline. In the depicted embodiment, pod 532 has died. Upon detection of pod 532 dying or going offline, a next pod, e.g., pod 531 can detect that pod 532 has gone offline due to its periodic queries to the healthbus and determining that pod 532 has failed to publish a health status (e.g., heartbeat) message to the healthbus for some length of time. Upon such determination, pod 531 can query 905 the instance store 810 to determine if pod 532, based on, for example, its identification, had, prior to its termination, any graphs (e.g., long running transactions) that it had stored within the instance store 810.

In accordance with an embodiment, upon the instance store returning a list of one or more stored graphs, pod 531 can then pick up those graphs and claim (or pass off to other, less loaded pods) for completion of the service requests.

In accordance with an embodiment, while this workflow recovery is discussed in the context of one pod querying the instance store to retrieve the state of one or more workflows of an inactive pod, a live pod can additionally pass a plurality of node identifiers to the instance store in the event that more than one pod has gone inactive or otherwise dead. In this way, workflows from terminated replicas that originally spanned several pods (e.g., five long running workflows that span five replicas on five separate pods) can be picked up by, or transferred by a single (or many) live pods.

Figure 10:
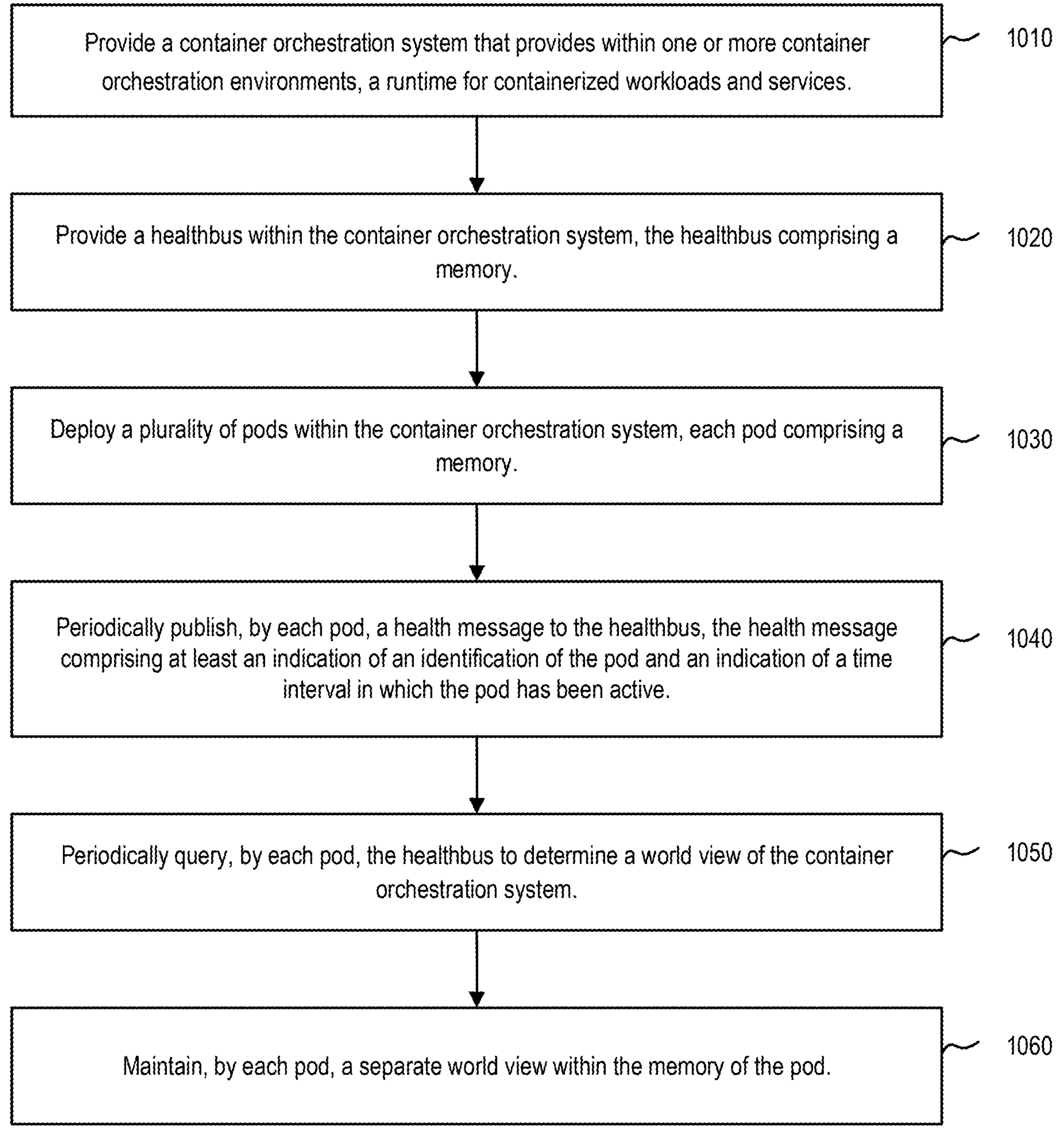
FIG. 10 is a flowchart of a method for sharing vitals among service replicas to enable processing of long running workflows within a container orchestration system, in accordance with an embodiment.

FIG. 10 is a flowchart of a method for sharing vitals among service replicas to enable processing of long running workflows within a container orchestration system, in accordance with an embodiment.

In accordance with an embodiment, at step 1010, the method can provide a container orchestration system that provides within one or more container orchestration environments, a runtime for containerized workloads and services.

In accordance with an embodiment, at step 1020, the method can provide a healthbus within the container orchestration system, the healthbus comprising a memory.

In accordance with an embodiment, at step 1030, the method can deploy a plurality of pods within the container orchestration system, each pod comprising a memory.

In accordance with an embodiment, at step 1040, the method can periodically publish, by each pod, a health message to the healthbus, the health message comprising at least an indication of an identification of the pod and an indication of a time interval in which the pod has been active.

In accordance with an embodiment, at step 1050, the method can periodically query, by each pod, the healthbus to determine a world view of the container orchestration system.

In accordance with an embodiment, at step 1060, the method can maintain, by each pod, a separate world view within the memory of the pod.

In accordance with various embodiments, the teachings herein may be conveniently implemented using one or more conventional general purpose or specialized computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the teachings herein can include a computer program product which is a non-transitory computer readable storage medium (media) having instructions stored thereon/in which can be used to program a computer to perform any of the processes of the present teachings. Examples of such storage mediums can include, but are not limited to, hard disk drives, hard disks, hard drives, fixed disks, or other electromechanical data storage devices, floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems, or other types of storage media or devices suitable for non-transitory storage of instructions and/or data.

The foregoing description has been provided for the purposes of illustration and description. It is not intended to be exhaustive or to limit the scope of protection to the precise forms disclosed. Many modifications and variations will be apparent to the practitioner skilled in the art. For example, although various examples are described above that illustrate usage in Oracle Cloud or Kubernetes environments, the various components, processes, and features described herein can be used with other types of container orchestration systems, or other types of computing environments.

The embodiments were chosen and described in order to best explain the principles of the present teachings and their practical application, thereby enabling others skilled in the art to understand the various embodiments and with various modifications that are suited to the particular use contemplated. It is intended that the scope be defined by the following claims and their equivalents.

What is claimed is:

1. A system for sharing vitals among service replicas to enable processing of long running workflows within a container orchestration system, comprising:

a cloud computing environment that operates on a computing infrastructure comprising one or more processors, memory, software resources, and application program interfaces that provide access to shared cloud resources via a compute resources layer, wherein the cloud computing environment includes a container orchestration system that enables containerized application workflows to be deployed to a container orchestration environment as containerized compute instances;

wherein the container orchestration system provides within the container orchestration environment, a runtime for containerized workloads and services; and wherein the container orchestration system includes a healthbus to which pods periodically publish health information as health messages, the healthbus comprising a memory that can be queried by another pod to obtain a status of other operational pods within the system when a service is activated in the pod;

wherein for a service requested within the container orchestration environment, said service associated with a long running workflow, the container orchestration system establishes a deployment is that manages a replica set including a plurality of pods that are deployed within the container orchestration system, each pod comprising a memory, wherein each pod contains a replica of a blueprint associated with the requested service, wherein when the pods are running, the container orchestration system manages the long running workflow associated with the requested service so that workflows are not duplicated within the pods;

wherein each pod periodically publishes a health message to the healthbus, the health message comprising at least an indication of an identification of the pod, an indication of a time interval in which the pod has been active, and an indication of which other pods the sending pod is aware of that are active;

wherein each pod periodically queries the healthbus to determine a world view of the container orchestration system, for use by the pod;

wherein each pod within the replica set maintains its separate world view within the memory of the pod, for use by the pod in managing the long running workflow associated with the requested service so that the workflows are not duplicated within the pods.

2. The system of claim 1, wherein each health message further comprises an indication of any workflows that each pod is, at the time of publishing the respective health message, running.

3. The system of 2, further comprising:

an instance store within the container orchestration system, the instance store comprising a memory.

4. The system of claim 3, wherein a first pod of the plurality of pods communicates to the instance store a state of a long running workflow currently running within a replica within the first pod, wherein at the time of communication, the long running workflow is waiting on a response message.

5. The system of claim 4, wherein after communicating the state of the long running workflow, the first pod goes inactive;

wherein a second pod of the plurality of pods determines that the first pod is inactive;

wherein upon the second pod determining that the first pod is inactive, the second pod automatically queries the instance store with the identification of the first pod;

wherein, in response to the query, the second pod retrieves the state of the long running workflow and actives the long running workflow within a replica within the second pod.

6. The system of claim 2, wherein, upon receiving a request for a new workflow, a first pod of the plurality of pods queries the world view within the memory of the first pod to determine a neighboring pod with a lowest current load.

7. The system of claim 6, wherein, based upon the query of the world view, the first pod transfers the request for the new workflow to the determined neighboring pod with the lowest current load.

8. A method for sharing vitals among service replicas to enable processing of long running workflows within a container orchestration system, comprising:

providing, on a computing infrastructure comprising one or more processors, memory, software resources, and application program interfaces, a cloud computing environment that provides access to shared cloud resources via a compute resources layer, wherein the cloud computing environment includes a container orchestration system that enables containerized application workflows to be deployed to a container orchestration environment as containerized compute instances;

wherein the container orchestration system provides within the container orchestration environment, a runtime for containerized workloads and services;

providing, by the container orchestration system, a healthbus to which pods periodically publish health information as health messages, the healthbus comprising a memory that can be queried by another pod to obtain a status of other operational pods within the system when a service is activated in the pod;

for a service requested within the container orchestration environment, said service associated with a long running workflow, establishing, by the container orchestration system, a deployment that manages a replica set, including deploying a plurality of pods within the container orchestration system, each pod comprising a memory, wherein each pod contains a replica of a blueprint associated with the requested service, wherein when the pods are running, the container orchestration system manages the long running workflow associated with the requested service so that workflows are not duplicated within the pods;

periodically publishing, by each pod, a health message to the healthbus, the health message comprising at least an indication of an identification of pod, an indication of a time interval in which the pod has been active, and an indication of which other pods the sending pod is aware of that are active;

periodically querying, by each pod, the healthbus to determine a world view of the container orchestration system, for use by the pod; and maintaining, by each pod within the replica set, a separate world view within the memory of the pod, for use by the pod in managing the long running workflow associated with the requested service so that the workflows are not duplicated within the pods.

9. The method of claim 8, wherein each health message further comprises an indication of any workflows that each pod is, at the time of publishing the respective health message, running.

10. The method of 9, further comprising:

providing an instance store within the container orchestration system, the instance store comprising a memory.

11. The method of claim 10, wherein a first pod of the plurality of pods communicates to the instance store a state of a long running workflow currently running within a replica within the first pod, wherein at the time of communication, the long running workflow is waiting on a response message.

12. The method of claim 11, wherein after communicating the state of the long running workflow, the first pod goes inactive;

wherein a second pod of the plurality of pods determines that the first pod is inactive;

wherein upon the second pod determining that the first pod is inactive, the second pod automatically queries the instance store with the identification of the first pod;

wherein, in response to the query, the second pod retrieves the state of the long running workflow and actives the long running workflow within a replica within the second pod.

13. The method of claim 9, wherein, upon receiving a request for a new workflow, a first pod of the plurality of pods queries the world view within the memory of the first pod to determine a neighboring pod with a lowest current load.

14. The method of claim 13, wherein, based upon the query of the world view, the first pod transfers the request for the new workflow to the determined neighboring pod with the lowest current load.

15. A non-transitory computer readable storage medium having instructions thereon, which when read and executed by a computer including one or more processors cause the computer to perform a method comprising:

providing, on a computing infrastructure comprising one or more processors, memory, software resources, and application program interfaces, a cloud computing environment that provides access to shared cloud resources via a compute resources layer, wherein the cloud computing environment includes a container orchestration system that enables containerized application workflows to be deployed to a container orchestration environment as containerized compute instances;

wherein the container orchestration system provides within the container orchestration environment, a runtime for containerized workloads and services;

providing, by the container orchestration system, a healthbus to which pods periodically publish health information as health messages, the healthbus comprising a memory that can be queried by another pod to obtain a status of other operational pods within the system when a service is activated in the pod;

for a service requested within the container orchestration environment, said service associated with a long running workflow, establishing, by the container orchestration system, a deployment that manages a replica set, including deploying a plurality of pods within the container orchestration system, each pod comprising a memory, wherein each pod contains a replica of a blueprint associated with the requested service, wherein when the pods are running, the container orchestration system manages the long running workflow associated with the requested service so that workflows are not duplicated within the pods;

periodically publishing, by each pod, a health message to the healthbus, the health message comprising at least an indication of an identification of pod, an indication of a time interval in which the pod has been active, and an indication of which other pods the sending pod is aware of that are active;

periodically querying, by each pod, the healthbus to determine a world view of the container orchestration system, for use by the pod; and maintaining, by each pod within the replica set, a separate world view within the memory of the pod, for use by the pod in managing the long running workflow associated with the requested service so that the workflows are not duplicated within the pods.

16. The non-transitory computer readable storage medium of claim 15, wherein each health message further comprises an indication of any workflows that each pod is, at the time of publishing the respective health message, running.

17. The non-transitory computer readable storage medium of 16, the method further comprising:

providing an instance store within the container orchestration system, the instance store comprising a memory.

18. The non-transitory computer readable storage medium of claim 17, wherein a first pod of the plurality of pods communicates to the instance store a state of a long running workflow currently running within a replica within the first pod, wherein at the time of communication, the long running workflow is waiting on a response message.

19. The non-transitory computer readable storage medium of claim 18, wherein after communicating the state of the long running workflow, the first pod goes inactive;

wherein a second pod of the plurality of pods determines that the first pod is inactive;

wherein upon the second pod determining that the first pod is inactive, the second pod automatically queries the instance store with the identification of the first pod;

wherein, in response to the query, the second pod retrieves the state of the long running workflow and actives the long running workflow within a replica within the second pod.

20. The non-transitory computer readable storage medium of claim 16, wherein, upon receiving a request for a new workflow, a first pod of the plurality of pods queries the world view within the memory of the first pod to determine a neighboring pod with a lowest current load; and wherein, based upon the query of the world view, the first pod transfers the request for the new workflow to the determined neighboring pod with the lowest current load.

* * * * *